Sept. 30, 1958  E. W. BURKHAMMER  2,853,767
METHOD OF MAKING HIGH DENSITY FERROUS ALLOY
POWDER COMPACTS AND PRODUCTS THEREOF
Filed March 23, 1955  4 Sheets-Sheet 2

INVENTOR
Eugene W. Burkhammer
BY
ATTORNEY

INVENTOR
Eugene W. Burkhammer
BY
ATTORNEY

Sept. 30, 1958     E. W. BURKHAMMER     2,853,767
METHOD OF MAKING HIGH DENSITY FERROUS ALLOY
POWDER COMPACTS AND PRODUCTS THEREOF
Filed March 23, 1955     4 Sheets-Sheet 4

INVENTOR
Eugene W. Burkhammer
BY
Nicholas Laug
ATTORNEY

United States Patent Office 2,853,767
Patented Sept. 30, 1958

2,853,767

METHOD OF MAKING HIGH DENSITY FERROUS ALLOY POWDER COMPACTS AND PRODUCTS THEREOF

Eugene W. Burkhammer, Zionsville, Ind., assignor to P. R. Mallory & Co., Inc., Indianapolis, Ind., a corporation of Delaware Application March 23, 1955, Serial No. 496,180

12 Claims. (Cl. 29—182)

This invention relates to the art of powder metallurgy, and, more particularly, to a method of making high density ferrous alloy powder compacts and to the products of such method.

Powder metallurgists have been attempting for many years to produce structural alloys, such as particularly iron base alloys, by powder metallurgical procedures that have physical properties approaching or equaling those of cast or wrought alloys of similar composition. One of the most important requisites for this attempt in duplication of properties is the reduction of porosity in the powder alloys to a minimum, in other words, the increase of sintered densities to near theoretical densities. These high densities result in strengths nearly equal to those of cast or wrought materials and at the same time reduce to a minimum the notch sensitivity due to retained porosity.

It was generally known and was considered essential by those skilled in the art that to obtain high density powder compacts by the conventional press and sinter method, one must start with powder of small particle size and favorable size distribution. The most important prior procedures for obtaining high densities generally involved prolonged sintering at elevated temperatures, or the application of coining (repressing) and re-sintering steps, or a combination of these techniques. Other prior procedures, such as hot pressing, which combined the pressing and sintering steps in a single operation, likewise yielded high density products, the same as cold and hot working of the sintered parts. A further prior procedure comprises the infiltration of sintered skeletons of the base metal with the alloying metal of lower melting point, such as copper, and the like. All of these prior procedures, however, were characterized by serious difficulties and disadvantages. First of all, the metal powder of small particle size was quite expensive and had poor flow characteristics which seriously interfered with the pressing operation. The numerous and complex operations required to be carried out to obtain high densities increased the cost of production to such an extent that the powder compacts produced in this manner could not compete cost-wise with their cast or wrought and machined counterparts. In addition, the infiltration process was also seriously limited as to composition, microstructure, size and shape of the product. Although various other suggestions and proposals were made to solve the problem which confronted the art of powder metallurgy, none, as far as I am aware, of these suggestions and proposals was completely satisfactory and successful when carried into practice on an industrial scale.

I have discovered that the outstanding problem may be solved in a remarkably simple manner.

It is an object of the present invention to improve methods of producing high density ferrous alloys by powder metallurgical procedures.

It is another object of the present invention to provide a novel and improved method of producing high density ferrous alloys from powders of special characteristics by means of a single pressing and sintering operation.

It is a further object of the invention to provide a method of producing structural parts from ferrous alloys having at least 94% of the theoretical density by powder metallurgical procedures involving a single pressing and sintering step which is sufficiently economical as to successfully compete cost-wise with similar parts having a cast or wrought structure.

It is also within the contemplation of the invention to provide a novel method of producing ferrous metal and alloy powders having such characteristics as to render them eminently suitable for the manufacture of structural parts of high density therefrom at a fraction of the present cost of powders having comparable particle size.

The invention also contemplates pressed and sintered ferrous base alloys containing at least 0.25% by weight of nickel, characterized by a density which is at least 94% of the theoretical density and by heretofore unobtainable mechanical properties.

Other and further objects and advantages of the present invention will become apparent from the following description, taken in conjunction with the accompanying drawings, in which.

Broadly stated, in accordance with the principles of the present invention, the starting material is iron powder characterized by particles which are individually porous, such as commercial sponge iron powder. This powder is heated in an oxidizing atmosphere in order to oxidize it to a predetermined degree and thereby to increase the brittleness of its particles, such oxidizing treatment being greatly facilitated by the porous nature of the individual particles.

The proper amounts of other alloying agents, either as the basic metal or its oxide, if hydrogen reducible, are added to the oxidized iron and the mixture comminuted to the desired particle size. For best results and highest sintered densities, these alloying agents should include at least 0.25% by weight of nickel. The resulting powder mixture is heated in a reducing atmosphere to reduce the oxides to the metallic state. This reduction step also results in a prealloying of the metals, making it possible to sinter compacts pressed from the powders to a higher final density in a shorter time. Particle size of the powder is established and controlled by the length of time the mixed oxides and metals are ball milled and by the time and temperature of reduction. The reducing step causes some agglomeration or sintering together of the particles. This "sinter cake" is broken up into small agglomerates. However, these agglomerates consist of groups of individual particles which, if they are properly pulverized, retain their porosity and identity as such and will flow at a rate heretofore unobtainable with powders having an average particle size in the 4 to 10 micron range.

After reduction and pulverizing, the powder mixture is blended with a suitable lubricant and possibly with additional alloying agents which cannot be reduced by hydrogen and which for this reason must not go through the hydrogen reduction furnace with the ball milled oxides. Such alloying agents are, for example, chromium, silicon in the form of ferrosilicon, vanadium in the form of ferrovanadium, and the like. Although manganese cannot be reduced by hydrogen, it has been found that electrolytic manganese can be milled with the oxides and the mixture coreduced with little or no oxidation of the manganese taking place.

Compacts of the desired shape are now pressed from the powders and are sintered in a reducing or inert atmosphere or in a vacuum furnace. Experience with the pressed and sintered compacts of the the invention has demonstrated that ferrous alloy compacts of high density, strength, and ductility superior to those made from commercial alloy powders of similar compositions using similar gorming methods may be obtained by means of a single pressing and sintering operation. For the purpose of the present invention, high density is defined as being at least 94% of the theoretical density.

The reasons underlying the surpising results obtained by the method of the invention are as fololws:
(1) Particle size
(2) Particle structure
(3) Particle size distribution
(4) High purity of the powders
(5) Catalytic effect of nickel The small particle size, particle structure (porous, irregular, jagged shape), and particle size distribution yield pressed compacts in which the voids are pores between particles are minute compared to the voids or pores in compacts pressed from powders of a larger particle size. This fact, together with the high purity of the powders and the catalytic action of nickel, results in a surface energy level on each individual particle that is high enough to cause densification of the compact to near the theoretical density. This densification is complete enough to practically eliminate residual porosity. The discovery that obtaining a high sintered density, even with the small particle size, optimum particle structure, and particle size distribution is greatly facilitated by the presence of at least 0.25% by weight of nickel, is one of the important features of the present invention. The extremely high densities produced from powders meeting these conditions result in physical properties closely approaching those of cast or wrought materials.

Figure 1:
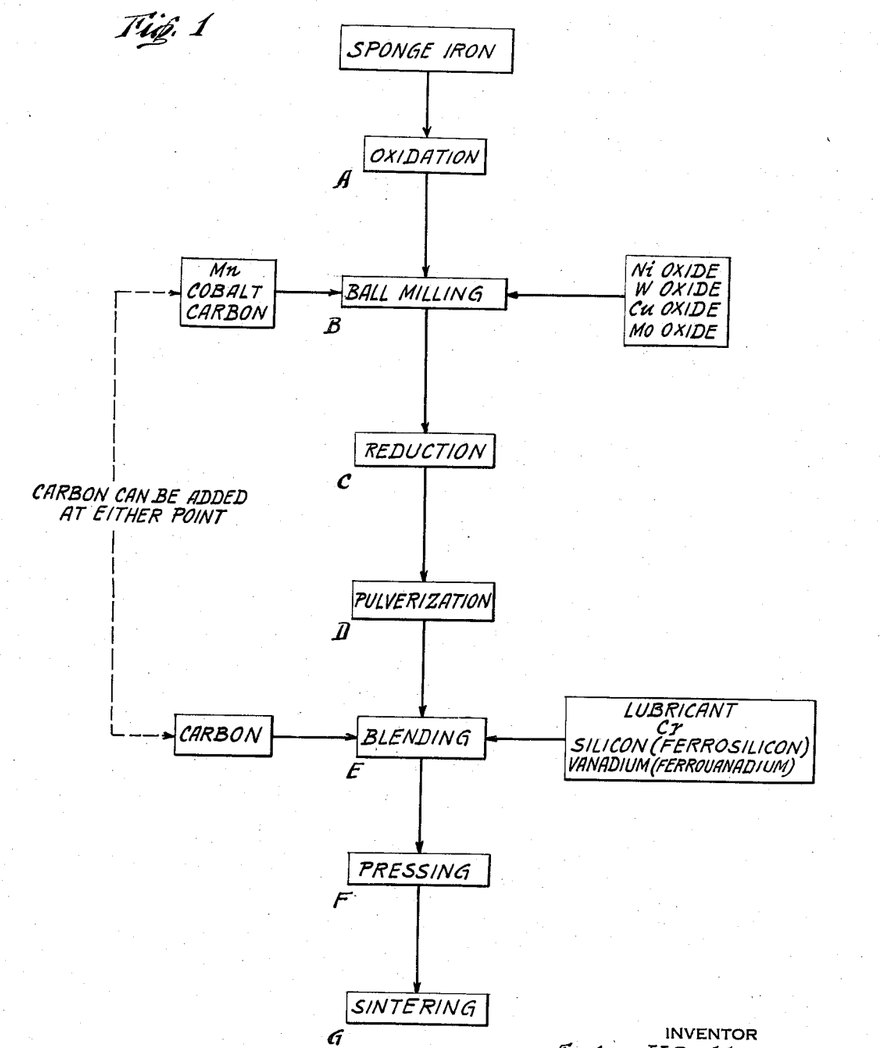
Fig. 1 is a flow sheet exemplifying the sequence of the several operative steps employed in carrying the method of the invention into practice.
Figure 2:
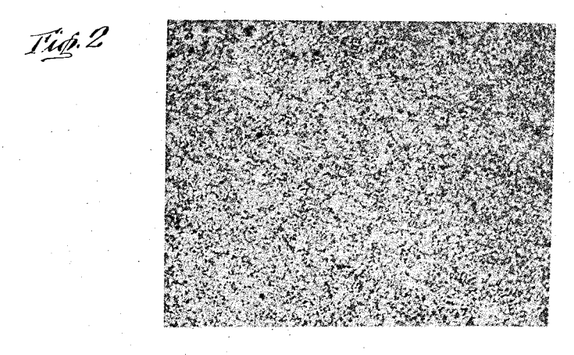
Figs. 2 to 6 are photomicrographs illustrating the microstructures of certain preferred high density ferrous alloys made by the method of the invention.
Figure 3:
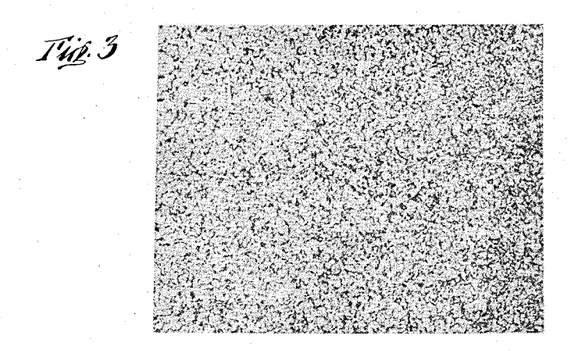
Figure 4:
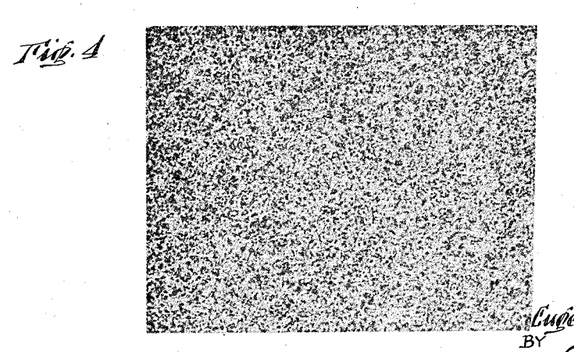

The invention will now be more fully described, reference being had to the flow sheet constituting Fig. 1 of the accompanying drawing.

(A) OPERATION

Commercial sponge iron powder, such as Swedish sponge iron, is oxidized to a weight gain between a minimum amount of 8% and a maximum amount of 29%, the preferred weight gain being between 11% to 18%. The principal object of this oxidizing treatment is to increase the brittleness of the powder particles and thereby to facilitate comminution of such particles. It has been found that the weight gain, in other words, the degree of oxidation, is quite critical and that the objects of the invention cannot be fully accomplished if the range stated is exceeded in either direction. Thus, oxidation to less than a weight gain of 8% does not provide sufficient brittleness and results in inefficient milling and the formation of platelets, while oxidation to more than 29% weight gain requires unduly long reducing treatment and results in a terminal average particle size after reduction which is too large to give compacts of the desired high sintered densities.

Oxidation is accomplished by heating the powder in an oxidizing atmosphere at temperatures of 300° to 100° C. for suitable time periods, heating at 700° C. in air for 20 minutes being the preferred procedure when using sponge iron of a particle size of minus 50 mesh. The lower oxidizing temperatures require too much time, while the higher temperatures result in a higher degree of sintering which requires more milling time to comminute the powder to the desired 2–4 micron particle size range.

In addition to increasing the brittleness of the powder particles, the oxidation treatment is also beneficial in obtaining some degree of purification due to the volatilization of volatile impurities either in their elemental stage or as their oxides.

$Fe_2O_3$ (hematite) or $Fe_3O_4$ (magnetic), which represent weight gains of 43% and 38% respectively, can be successfully reduced with hydrogen but the reduction time, as in the case of sponge iron oxidized to the extent of a weight gain of over 29%, is so long that the resulting particle size of the reduced powder is too large to be of any value in obtaining sintered densities over 94% of the theoretical density. Also, from a cost standpoint, these materials not only take a much longer time for reduction but also require more gas for reduction.

The technique of reoxidizing to a predetermined and critically controlled degree the inexpensive and high purity commercial iron powder of spongy and porous nature constitutes one of the most important concepts of the present invention and provides the following important practical advantages.

(1) Increases the brittleness of the powder particles, thereby facilitating reduction in size by ball milling or other procedures.

(2) Effects a certatin degree of purification.

(3) Retains the porous nature of the elementary particles so that subsequent effective reduction in the reducing gas atmospheres and pre-alloying by solid diffusion among the major and minor alloying constituents can be readily obtained.

(B) BALL MILLING

The iron powder reoxidized to a critically controlled extent is ball milled in a ball mill of the conventional type with either the oxides of hydrogen-reducible alloying agents or with the metals themselves. In this case, alloying metals, such as nickel, copper, tungsten, molybdenum, and the like, may be introduced into the ball mill either in their metallic state, or as oxides. In general, however, it is very desirable to add as many of the alloying agents as possible in the oxide form and to reduce such oxides simultaneously with the subsequent reduction of the iron. If carbon is one of the desired ingredients, it may be added at this stage of the process in the form of calcined coke or graphite in a precalculated amount to allow for the loss during reduction. The milling time can be varied to produce the desired oxide particle size of 2 to 4 microns, but it has been found that milling for four hours will consistently produce material with the desired particle size when one starts with material that is minus 50 mesh prior to oxidation.

The particle size distribution obtained by ball milling of the mixture of partially oxidized iron and of other alloying agents closely approaches a normal distribution curve. It may be pointed out here that all particle sizes referred to in the present application are intended to mean Fisher Average Particle Size, as determined on a Fisher Sub Sieve Sizer.

(C) REDUCTION

The milled oxides and metals are reduced in hydrogen or cracked ammonia at temperatures between 700° to 1000° C., the preferred temperature range being 975° C.±10° C. This is accomplished by placing the powder in stainless steel trays and stoking it through a furnace with a countercurrent of reducing gas flowing over it. The stoking rate is adjusted according to the temperature being used. Using the lower reduction temperatures results in a longer reduction time per unit weight of powder. Temperatures over 1000° C. cause an appreciable degree of sintering of the powder and large terminal particle sizes. Gas flow can be adjusted to the furnacing conditions that are employed. Using the preferred reducing temperature of 975° C.±10° C., a gas flow of 250–300 cu. ft./hr. is sufficient to produce about 6.6 pounds of iron alloy powder per hour. Under similar conditions, comparable reduction of magnetite ore of the same average particle size will only produce about 3.3 pounds of reduced powder per hour. Actual experimental results showed, however, that even with a gas flow as high as 500 cu. ft./hr. the powder reduced from magnetite still contained about 5–10% FeO.

Effective reduction by the gas appears to be greatly facilitated by the fact that the powder particles of the major component are in a porous condition and are thus permeated by the gas. It has been further found that the alloys should preferably contain at least 0.25% by weight of nickel as an alloying constituent in order to yield superior results as to the facility of processing and ultimate physical properties. The use of nickel as a densifying agent is one of the important features of the present invention. While the reasons for the beneficial effects of the presence of nickel on the process of the invention and on the alloys resulting therefrom are not fully understood, it is believed that these are connected with the outstanding catalytic nature of nickel which accelerates reduction reactions, promotes gaseous and solid diffusion and energizes the surface activities of other particles during the reduction and sintering processes.

(D) PULVERIZATION

Any method of pulverization may be used for disintegrating the reduced and slightly sintered powder metal cake, such as, for example, disk grinders, ball mills, tube mills, hammer mills, and the like. At the end of the pulverization process the powder should be in small agglomerates consisting of groups of particles which should be in the range of 4 to 10 microns, the preferred range being 5 to 7 microns. This restriction on the particle size of the prepared powder is one of the essential features of the present invention.

The powder prepared in accordance with the invention has excellent free flowing characteristics so that it is suitable for pressing on automatic equipment even though it is extremely fine. In contrast to this, it is well known to those skilled in the art that heretofore economic considerations have prevented the use of conventional metal powders of similar particle size in commercial production because of their poor flow characteristics and other detrimental properties which made it impossible to obtain powder compacts of a high and uniform density in an efficient and economical manner.

(E) BLENDING

At this point a suitable lubricant, such as zinc stearate, and additional alloying agents, which cannot be used in the oxide form, are added to the powder. The tumbling action of the blender also increases the apparent density of the powder. The additional alloying agents may be, for example, chromium, silicon in the form of ferrosilicon, vanadium in the form of ferrovanadium, and the like. It is also possible to add carbon to the powder at this stage of the process, instead of adding such element during the ball milling step.

The blending step may be carried out by any of the commercially available tumblers, blenders, or rotating drums. Excellent results are obtained, for example, with a Patterson and Kelly twin shell blender without an intensifier bar.

(F) PRESSING

Pressing is accomplished in the conventional manner using presses that will provide top and bottom action either by die table action or by the movement of both punches.

(G) SINTERING

The pressed compacts are sintered in a reducing atmosphere at temperatures between 1200° C. and 1400° C. for ½ to 4 hours depending on the composition of the compact and the final density desired. It is also possible, however, to carry out the sintering operation in a vacuum furnace of suitable construction.

The method of the invention has a broad field of application for the economical manufacture of high density ferrous alloys containing any of the elements which can be sintered in a protective atmosphere, such as hydrogen, cracked ammonia, etc. These elements include, in addition to iron, manganese, chromium, carbon, molybdenum, tungsten, nickel, cobalt, silicon, copper, vanadium, etc. Other elements which cannot be sintered in protective atmospheres, such as tantalum, columbium, titanium, boron, aluminum, etc., may be added provided that the sintering step is carried out in a vacuum, or in an extremely inert atmosphere, such as argon.

For purposes of illustration, alloys of the following nominal composition may be mentioned:

(1) 0.5 to 1% Ni, 6.5% Cu, balance Fe
(2) 1% Ni, 6.5% Cu, 0.05 to 0.20% C, balance Fe
(3) 1% Ni, 1% Mn, balance Fe
(4) 0.5% Ni, 1% Mn, 0.4 to 0.5% C, balance Fe The following table lists some pertinent data as to the chemical and physical properties of these alloys.

Figure 5:
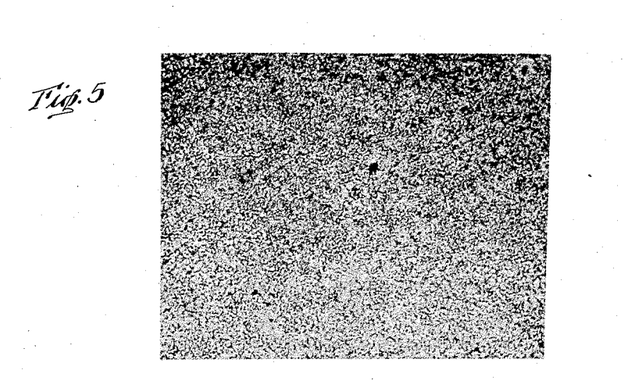
Figure 6:
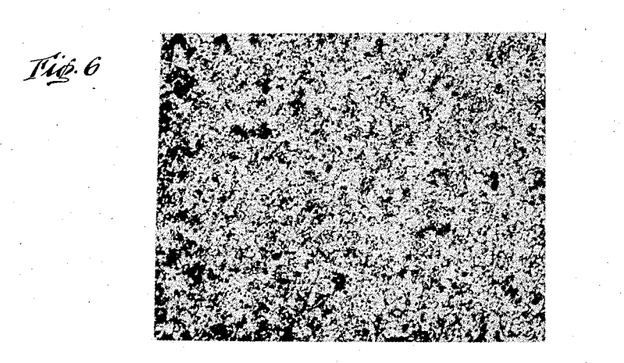

Figs. 2, 3, 4 and 6 show the microstructures of the four alloys referred to in the foregoing in the as-sintered condition. Fig. 5 shows the martensitic structure of the carbon-containing Fe—Ni—Mn alloy after quenching from 1470° F. The photomicrographs show that the microstructures of these materials are finer than ASTM 7.

It has been pointed out in the foregoing that the use of iron powder, such as sponge iron, characterized by individually porous particles, as the starting material, is one of the important features of the present invention. As a result of the porosity of its individual particles, which exposes a large effective surface area, the sponge iron powder responds to oxidation in a manner that allows short time oxidation and short time milling. This has been proven experimentally by oxidizing the sponge iron powder for 20 minutes at 700° C. and determining the Fisher Average Particle Size (FAPS) and porosity after one hour's milling and two hours' milling. The results were FAPS 3.20 microns, porosity 0.52, after one hour's milling and FAPS 2.15 microns, porosity 0.52, after two-hours' milling. Material reoxidized totally to $Fe_3O_4$ had after one hour's milling a FAPS of 2.50 microns and a porosity of 0.456. These experimental results clearly indicate that although the powder is milled down to a very fine FAPS, there is no corresponding drop in the porosity but most of the original porosity is retained. The retained porosity then again exposes a large effective area for the purposes of reduction and alloying. This can be best illustrated by the fact that the ferrous powders of the prior art, when they are alloyed with copper in amounts greater than 5% by weight, exhibit a tendency to grow in volume, in other words, to be less dense. In constrast to this, copper in excess of 25% by weight has been added in the form of copper oxide to the oxidized ferrous powder, together with a small percentage of nickel, and alloyed with the iron present in such powder by the coreduction method of the invention, producing sintered densities over 94–95% of the theoretical densities.

Figure 7:
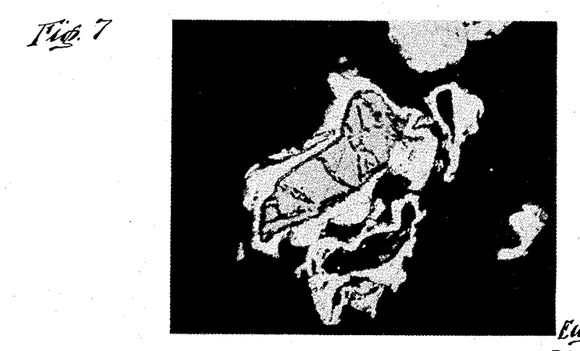
Figs. 7 and 8 are photomicrographs illustrating the physical appearance of Swedish sponge iron powder, enlarged to 500 and 75 diameters, respectively.
Figure 8:
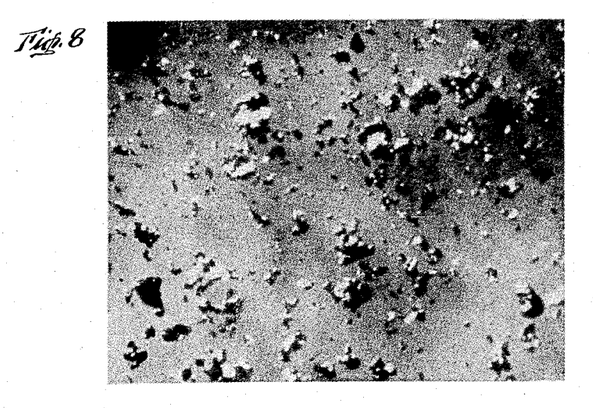
Figure 9:
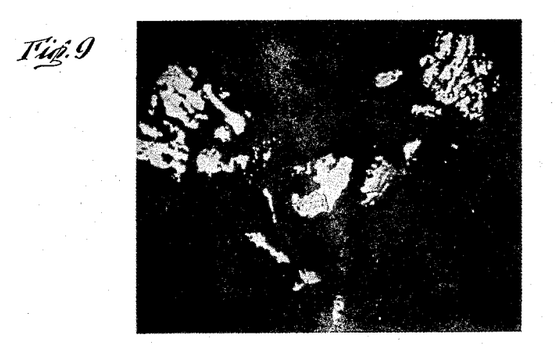
Figs. 9 and 10 are similar photomicrographs illustrating the physical appearance of the porous iron powder made by the method of the invention.
Figure 10:
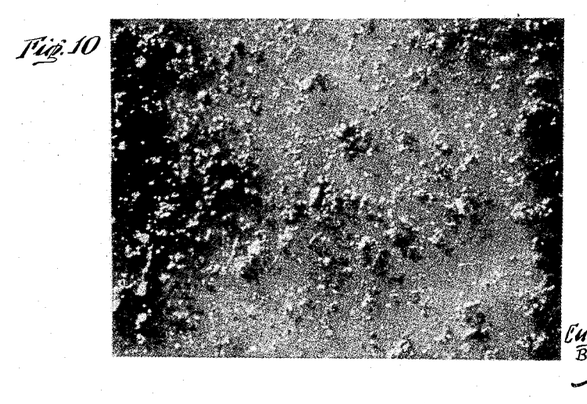

The novel and unusual characteristics of the iron powder prepared by the method of the invention will become readily apparent from a comparison of Figs. 7 and 8 with Figs. 9 and 10 of the drawing, respectively. Of these Figs. 8 and 10 have been taken at magnifications of 75 diameters to show the relative sizes and particle shapes of Swedish sponge iron and of the iron powder of the invention, while Figs. 7 and 9 have been taken at magnifications of 500 diameters in order to show the respective grain structures of Swedish sponge iron and of the iron powder of the invention. It will be noted that the iron powder of the invention is characterized by its Table

| Micrograph | Nominal Composition | Chemical Analysis | Sintering Temp., °C. | Sintering Time, 2 hrs. | Sintered Density | Percent Theoretical Density | U. T. S. | Percent Elongation |
|---|---|---|---|---|---|---|---|---|
| | 0.5% Ni<br>6.5% Cu<br>bal. Fe | 0.47% Ni<br>6.43% Cu | 1,375 | 2 | 7.52 | 95 | 125,000 | 5.0 |
| | 1% Ni<br>6.5% Cu<br>bal. Fe | 1.01% Ni<br>6.38% Cu | 1,250 | 2 | 7.50 to 7.60 | 94.7 to 96 | 122,000 to 129,000 | 4 to 7 |
| Fig. 2 | 1% Ni<br>6.5% Cu<br>bal. Fe | 1.01% Ni<br>6.38% Cu | 1,375 | 2 | 7.60 to 7.70 | 96 to 97 | 115,000 | 6.0 |
| | 1% Ni<br>6.5% Cu<br>0.20% C<br>bal. Fe | 1.01% Ni<br>6.38% Cu<br>.14% C | 1,375 | ½ | 7.45 to 7.50 | 94 to 94.7 | 136,000 | 5.0 |
| | 1% Ni<br>6.5% Cu<br>0.20% C<br>bal. Fe | 1.01% Ni<br>6.38% Cu<br>.14% C | 1,375 | 1 | 7.50 to 7.55 | 94.7 to 95.2 | 137,000 | 4.5 |
| | 1% Ni<br>6.5% Cu<br>0.20% C<br>bal. Fe | 1.01% Ni<br>6.38% Cu<br>.14% C | 1,375 | 1½ | 7.55 to 7.58 | 95.2 to 95.8 | 135,000 | 5.5 |
| Fig. 3 | 1% Ni<br>6.5% Cu<br>0.20% C<br>bal. Fe | 1.01% Ni<br>6.38% Cu<br>.14% C | 1,375 | 2 | 7.60 to 7.70 | 96 to 97 | 132,000 to 136,000 | 5 to 7 |
| | 1% Ni<br>1% Mn<br>bal. Fe | 0.94% Ni<br>1.04% Mn | 1,250 | 1 | 7.47 | 94.6 | 54,200 | 20 |
| | 1% Ni<br>1% Mn<br>bal. Fe | 0.94% Ni<br>1.04% Mn | 1,250 | 2 | 7.52 | 95.3 | 53,900 | 20 |
| | 1% Ni<br>1% Mn<br>bal. Fe | 0.94% Ni<br>1.04% Mn | 1,250 | 3 | 7.57 | 96.0 | 52,600 | 21 |
| | 1% Ni<br>1% Mn<br>bal. Fe | 0.94% Ni<br>1.04% Mn | 1,375 | ½ | 7.47 | 94.6 | 57,000 | 25 |
| | 1% Ni<br>1% Mn<br>bal. Fe | 0.94% Ni<br>1.04% Mn | 1,375 | 1 | 7.56 | 96 | 57,000 | 27 |
| | 1% Ni<br>1% Mn<br>bal. Fe | 0.94% Ni<br>1.04% Mn | 1,375 | 1½ | 7.61 | 96.5 | 57,000 | 29 |
| Fig. 6 | 1% Ni<br>1% Mn<br>bal. Fe | 0.94% Ni<br>1.04% Mn | 1,375 | 2 | 7.55 to 7.65 | 95.2 to 97 | 55,000 to 60,000 | 26 to 32 |
| Fig. 4 | 1% Mn<br>0.50% Ni<br>0.40-0.50% C<br>bal. Fe | 0.93% Mn<br>0.58% Ni | 1,375 | 1 | 7.61 | 97.7 | 77,000 | 17 |
| Fig. 5 | 1% Mn<br>0.50% Ni<br>0.40-0.50% C<br>bal. Fe | 0.93% Mn<br>0.58% Ni | 1,375 | 1 | 7.61 | 97.7 | 146,500 | [1] 3.8 |

[1] Water quenched from 1,470° F.

small particle size and extremely porous structure, with a rugged or jagged, irregular shape. This characteristic, in combination with the correct particle size distribution, provides a powder having such pressing characteristics as to give a high green strength to the compact due to the interlocking or keying action of the particles. Also, the iron powder of the invention is less likely to be subject to pressure cracking, presumably because it is more fully annealed by the high reducing temperatures than conventional powders and thus takes more work hardening to cause pressure cracks. In addition, as a result of the oxidation step, the iron powder of the invention is almost entirely free of carbon unless it is intentionally added.

It may be pointed out here that the particle size of the iron powder of the invention is established by the milling and reducing operations. A small particle size, such as 2 to 4 microns, is established by the mill, but this particle size is increased quite rapidly during the reduction. This makes it necessary to control the length of the heating period during the reduction quite closely when the degree of oxidation of the powder and the time of ball milling are fixed. Once the terminal particle size is established by the reducing operation, it cannot be further reduced without reoxidizing and remilling. If it were attempted to comminute the reduced powder to break it up into individual particles of smaller size, such powder could not be used in automatic presses. This is due to the poor flow charateristics and low apparent density or fluffiness of the powder which would require excessively high fill ratios for pressing. Also, with such fine powders, it would be impossible to hold the size or weight uniform from compact to compact and the high internal friction would cause excessive gradients in the pressed density of green compacts.

Experience has demonstrated that for best results and to obtain the highest sintered densities, nickel in the amount of at least 0.25% by weight should preferably be present.

It will be noted that the method of the invention provides a number of important practical advantages. Thus, powder of the desired small particle size is obtained at a fraction of its present cost, in a short period of time, such as in 4 hours, as compared to the time required to mill hematite or magnetite to the desired particle size, which is between 24 to 96 hours. High density, such as at least 94% of the theoretical density, may be obtained with an amount of nickel as low as 0.25%, by employing only one press and sinter step. The porous character and small particle size of the powders produced in accordance with the invention promote solid diffusion which gives uniform alloying of the constituents in a short time period. Densities over 97% of the theoretical have been obtained from type 302 stainless steel compositions by sintering 4 hours at 1375° C., a result which has not been accomplished previously even by the addition of repressing and resintering operations. Compacts pressed from powder prepared by the present method do not laminate or develop pressure cracks even when pressed at very high pressures, such as over 40 tons per square inch. The method of the present invention makes it possible for the first time in the history of the art to produce high density ferrous alloy parts by powder metallurgical procedures on a quantity production scale and at a cost which is considerably lower than that of similar parts made by casting, forging and machining operations.

Although the present invention has been disclosed in connection with a few preferred embodiments thereof, variations and modifications may be resorted to by those skilled in the art without departing from the principles of the invention. All of these modifications and variations aare considered to be within the true spirit and scope of the present invention as disclosed in the foregoing description and defined by the appended claims.

What is claimed is:

1. The method of making high density ferrous alloys by powder metallurgical procedures which comprises heating iron powder consisting of individually porous particles in an oxidizing atmosphere to partially oxidize the same to a weight gain between 11% to 18%, admixing with said powder the ingredients to be alloyed with the iron in powder form, comminuting the resulting mixture of powders, reducing the mixture of powders, pulverizing the reduced mixture, pressing compacts from said mixture, and sintering said compacts in a protective atmosphere.

2. The method of making by powder metallurgical procedures ferrous alloys having a density which is at least 94% of the theoretical density, which comprises heating powder consisting of individually porous iron particles in an oxidizing atmosphere to partially oxidize the same to a weight gain between 8% and 29%, admixing with said oxidized powder the alloying ingredients selected from the group consisting of metals alloyable with iron and of hydrogen-reducible oxides of such metals in powder form, comminuting the resulting mixture, reducing the mixture, pulverizing the reduced mixture, pressing compacts from said mixture, and sintering said compacts.

3. The method of making by powder metallurgical procedures ferrous alloys having at least 94% of the theoretical density, which comprises heating powder consisting of individually porous iron particles in an oxidizing atmosphere to partially oxidize the same until its weight increases between 8% and 29%, admixing with said oxidized powder the alloying ingredients selected from the group consisting of metals alloyable with iron and their hydrogen-reducible oxides in powder form, comminuting the resulting mixture to a particle size between 2 and 4 microns, heating the comminuted mixture in a reducing atmosphere to reduce it to a mixture of elementary metal particles, pulverizing the reduced mixture to a particle size between 4 and 10 microns, pressing compacts from said mixture, and sintering said compacts under non-oxidizing conditions.

4. The powder metallurgical method of making ferrous alloys having at least 94% of the theoretical density which comprises heating commercial sponge iron powder characterized by porous particles in an oxidizing atmosphere at a temperature between 300° C. and 1000° C. to partially oxidize the same to the extent of an increase in weight between 8% and 29%, admixing with said oxidized powder the powdered ingredients to be alloyed with the iron, comminuting the resulting mixture to a particle size between 2 and 4 microns, heating the comminuted mixture in a reducing atmosphere at a temperature between 700° C. and 1000° C. to reduce it to the elementary metals, pulverizing the slightly sintered reduced mixture to agglomerates composed of the small particles in the range of 4 to 10 microns established by the conditions of the milling and reduction operations, pressing compacts from said mixture, and sintering said compacts under non-oxidizing conditions.

5. The powder metallurgical method of making high density ferrous alloys which comprises heating sponge iron powder in an oxidizing atmosphere at a temperature between 300° C. and 1000° C. to oxidize the same to a weight gain of 11% to 18%, admixing with said powder the alloying ingredients selected from the group consisting of metals alloyable with iron and their hydrogen-reducible oxides, ball milling the mixture to a particle size between 2 and 4 microns, heating the mixture in a reducing atmosphere at a temperature between 700° C. and 1000° C. to reduce it to the elementary metals, pulverizing the slightly sintered reduced mixture to agglomerates of particles, each individual particle being of a size in the range of 5 to 7 microns, pressing compacts from said mixture, and sintering said compacts under non-oxidizing conditions.

6. The method of making high density ferrous alloys by powder metallurgical procedures which comprises heating iron powder consisting of individually porous particles in an oxidizing atmosphere to partially oxidize the same to a weight gain between 11% to 18%, admixing with said powder the ingredients to be alloyed with the iron including at least about 0.25% by weight of nickel, comminuting the resulting mixture of powders, reducing the mixture of powders, pulverizing the reduced mixture, pressing compacts from said mixture, and sintering said compacts.

7. The method of making by powder metallurgical procedures ferrous alloys having at least 94% of the theoretical density, which comprises heating powder consisting of individually porous iron particles in an oxidizing atmosphere to partially oxidize the same to a weight gain between 8% and 29%, admixing with said oxidized powder the alloying ingredients selected from the group consisting of metals alloyable with iron and hydrogen-reducible oxides of such metals in powder form including at least about 0.25% by weight of nickel, comminuting the resulting mixture, reducing the mixture, pulverizing the reduced mixture, pressing compacts from said mixture, and sintering said compacts.

8. The powder metallurgical method of making ferrous alloys having at least 94% of the theoretical density which comprises heating sponge iron powder characterized by porous particles in an oxidizing atmosphere at a temperature between 300° C. and 1000° C. to partially oxidize the same to the extent of an increase in weight between 11% and 18%, admixing with said oxidized powder the powdered ingredients to be alloyed with the iron including at least 0.25% by weight of nickel, comminuting the resulting mixture to a particle size of 2 to 4 microns, heating the comminuted mixture in a reducing atmosphere at a temperature between 700° C. and 1000° C. to reduce it to the elementary metals, pulverizing the slightly sintered reduced mixture to agglomerates of particles, each individual particle having a size in a range of 4 to 10 microns, pressing compacts from said mixture, and sintering said compacts in a reducing atmosphere at a temperature between 1200° C. and 1400° C. for a period between ½ to 4 hours.

9. The powder metallurgical method of making ferrous alloys having at least 94% of the theoretical density which comprises heating minus 50 mesh sponge iron powder at 700° C. for 20 minutes in air to partially oxidize the same to a weight gain between 11% to 18%, admixing with said oxidized powder the powdered ingredients to be alloyed with the iron, ball milling the resulting mixture to a particle size between 2 and 4 microns, heating the comminuted mixture in a reducing atmosphere at a temperature between 965° C. and 985° C., pulverizing the reduced mixture to agglomerates consisting of groups of individual particles of a size between 5 and 7 microns, pressing compacts from said mixture, and sintering said compacts in a reducing atmosphere at a temperature between 1200° C. and 1400° C. for a period between ½ to 4 hours.

10. The method of making high density ferrous alloys by powder metallurgical procedures which comprises heating iron powder consisting of individually porous particles in an oxidizing atmosphere to partially oxidize the same to a weight gain between 11% and 18%, admixing with said powder particles of the alloying ingredients the oxides of which are reducible by hydrogen, comminuting the resulting mixture of the particles, reducing the mixture of the particles, pulverizing the reduced mixture, admixing with the reduced mixture metallic particles of the additional alloying ingredients which are not reducible by hydrogen, pressing compacts from said mixture, and sintering said compacts under conditions preventing oxidation.

11. A pressed and sintered iron base compact characterized by a density which is at least 94% of the theoretical density, said compact having characteristics resulting from heating individually porous iron powder particles in an oxidizing atmosphere to partially oxidize the same to a weight gain between about 11% and about 18%, admixing with said powder the ingredients to be alloyed with the iron in powder form, comminuting the resulting mixture of powders, reducing the mixture of powders, pulverizing the reduced mixture, pressing a compact from said mixture, and sintering said compact in a protective atmosphere.

12. As a new article of manufacture, an iron base powder composition constituted by particles of an average size between 4 and 10 microns and of a jagged irregular shape imparting high green strength to the compacts pressed therefrom due to the interlocking and keying action of the particles, said particles having characteristics resulting from heating individually porous iron powder particles in an oxidizing atmosphere to partially oxidize the same to a weight gain between about 11% and about 18%, admixing with said powder the ingredients to be alloyed with the iron in powder form, comminuting the resulting mixture of powders, reducing the mixture of powders, and pulverizing the reduced mixture to obtain iron base powder of the desired average particle size and suitable for producing therefrom compacts having a density of at least 94% of the theoretical density by a single pressing and a single sintering step.

References Cited in the file of this patent

UNITED STATES PATENTS

| | | |
|---|---|---|
| 1,453,057 | Williams | Apr. 24, 1923 |
| 1,506,246 | McMahon | Aug. 26, 1924 |
| 2,200,369 | Klinker | May 14, 1940 |
| 2,456,779 | Goetzel | Dec. 21, 1948 |
| 2,606,831 | Koehring | Aug. 12, 1952 |
| 2,665,999 | Koehring | Jan. 12, 1954 |

OTHER REFERENCES

"Treatise on Powder Metallurgy," by Goetzel, vol. 1, p. 54, published 1949; vol. 2, 1950, pp. 406–414.

UNITED STATES PATENT OFFICE
CERTIFICATE OF CORRECTION

Patent No. 2,853,767                                                      September 30, 1958

Eugene W. Burkhammer

It is hereby certified that error appears in the printed specification of the above numbered patent requiring correction and that the said Letters Patent should read as corrected below.

Column 3, line 6, for "mitxure" read -- mixture --; line 15, for "gorming" read -- forming --; line 20, for "fololws" read -- follows --; line 28, for "are" read -- or --; line 49, for the heading "(A) OPERATION" read -- (A) OXIDATION --; column 4, line 8, for "(magnetic)" read -- (magnetite) --.

Signed and sealed this 30th day of December 1958.

(SEAL)
Attest:

KARL H. AXLINE                                                ROBERT C. WATSON
Attesting Officer                                             Commissioner of Patents